(12) United States Patent
Carpenter et al.

(10) Patent No.: US 11,936,687 B2
(45) Date of Patent: *Mar. 19, 2024

(54) SYSTEMS AND METHODS FOR END-USER SECURITY AWARENESS TRAINING FOR CALENDAR-BASED THREATS

(71) Applicant: KnowBe4, Inc., Clearwater, FL (US)

(72) Inventors: Perry Carpenter, Austin, AR (US); Kathy Wattman, Dunedin, FL (US); Morgan Flake, Clearwater, FL (US); Detlev Weise, Berlin (DE); John Just, Palm Harbor, FL (US); Kevin Mitnick, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,744

(22) Filed: May 16, 2022

(65) Prior Publication Data
US 2022/0279017 A1   Sep. 1, 2022

Related U.S. Application Data

(63) Continuation of application No. 17/324,723, filed on May 19, 2021, now Pat. No. 11,336,688.
(Continued)

(51) Int. Cl.
*H04L 9/40*       (2022.01)
*G06F 9/451*       (2018.01)
(Continued)

(52) U.S. Cl.
CPC .......... *H04L 63/1483* (2013.01); *G06F 9/453* (2018.02); *G06Q 10/1093* (2013.01); *H04L 63/1433* (2013.01)

(58) Field of Classification Search
CPC . H04L 63/1483; H04L 63/1433; G06F 9/453; G06Q 10/1093
See application file for complete search history.

(56) References Cited

U.S. PATENT DOCUMENTS

| | | |
|---|---|---|
| 8,484,741 B1 | 7/2013 | Chapman |
| 8,615,807 B1 | 12/2013 | Higbee et al. |

(Continued)

FOREIGN PATENT DOCUMENTS

| | | |
|---|---|---|
| EP | 3 582 468 | 12/2019 |
| WO | WO-2016/164844 A1 | 10/2016 |

OTHER PUBLICATIONS

"Tricky Scam Plants Phishing Links in Your Google Calendar" Lily Hay Newman, Wired, Security https://www.wired.com/story/phishing-links-google-calendar-invites/ (Year: 2019).*

(Continued)

*Primary Examiner* — Randy A Scott
(74) *Attorney, Agent, or Firm* — Foley & Lardner LLP

(57) ABSTRACT

Systems and methods are described for providing calendar-based simulated phishing attacks to users of an organization. Initially, a context is identified for a calendar-based simulated phishing attack directed towards a user. An electronic calendar invitation for the calendar-based simulated phishing attack is then generated using the context. Thereafter, the electronic calendar invitation may be communicated to an electronic calendar of the user.

20 Claims, 8 Drawing Sheets

300

Related U.S. Application Data

(60) Provisional application No. 63/028,890, filed on May 22, 2020.

(51) Int. Cl.
  G06Q 10/10 (2023.01)
  G06Q 10/1093 (2023.01)

(56) References Cited

U.S. PATENT DOCUMENTS

| | | |
|---|---|---|
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,876,753 B1 | 1/2018 | Hawthorn |
| 9,912,687 B1 | 3/2018 | Wescoe et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 11,303,674 B2 * | 4/2022 | Onut .................. H04L 63/1425 |
| 2016/0164898 A1 | 6/2016 | Belani et al. |
| 2016/0301705 A1 | 10/2016 | Higbee et al. |
| 2019/0005428 A1 | 1/2019 | Kras et al. |
| 2019/0173819 A1 | 6/2019 | Wescoe et al. |
| 2019/0173913 A1 * | 6/2019 | Kras .................. H04L 63/1483 |
| 2019/0215335 A1 | 7/2019 | Benishti |
| 2019/0245885 A1 | 8/2019 | Starink et al. |
| 2020/0311260 A1 | 10/2020 | Klonowski et al. |
| 2020/0366712 A1 | 11/2020 | Onut et al. |
| 2021/0075827 A1 | 3/2021 | Grealish |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

OTHER PUBLICATIONS

"Scammer Turning to Bogus Google Calendar Invitations to Defraud Consumers"—Fraud Alerts, Fraud.Org, Oct. 1, 2019 https://fraud.org/google_calendar_alert/ (Year: 2019).*

"Tricky Scam Plants Phishing Links in Your Google Calendar"—Lily Hay Newman, Wired, Jun. 19, 2019 https://www.wired.com/story/phishing-links-google-calendar-invites/ (Year: 2019).*

International Preliminary Report on Patentability on PCT Appl. Ser. No. PCT/US2021/033161 dated Dec. 1, 2022 (8 Pages).

Scammers Turning in Bogus Google Calendar Invitations to Defraud Consumers—Fraud Alerts, Fraud Org. Oct. 1, 2019 https://fraud.org/google_calendar_alert/ (Year 2019).

Final Office Action on U.S. Appl. No. 17/324,723 dated Nov. 3, 2021.

Foreign Search Report on PCT PCT/US2021/033161 dated Sep. 2, 2021.

Notice of Allowance on U.S. Appl. No. 17/324,723 dated Mar. 31, 2022.

U.S. Office Action on U.S. Appl. No. 17/324,723 dated Jul. 19, 2021.

* cited by examiner

SYSTEMS AND METHODS FOR END-USER SECURITY AWARENESS TRAINING FOR CALENDAR-BASED THREATS

CROSS-REFERENCE TO RELATED APPLICATION

This application is a Continuation and claims priority to and the benefit of U.S. patent application Ser. No. 17/324,723, titled "SYSTEMS AND METHODS FOR END-USER SECURITY AWARENESS TRAINING FOR CALENDAR-BASED THREATS," and filed on May 19, 2021, which claims priority to and the benefit of U.S. Patent Application No. 63/028,890, titled "SYSTEMS AND METHODS FOR END-USER SECURITY AWARENESS TRAINING FOR CALENDAR-BASED THREATS," and filed on May 22, 2020, the contents of all of which are hereby incorporated herein by reference in its entirety for all purposes.

TECHNICAL FIELD

The present invention generally relates to systems and methods for facilitating user security awareness training for calendar-based threats. In particular, the systems and the methods relate to providing calendar-based simulated phishing attacks to users of an organization in order to test and develop security awareness training for calendar-based threats.

BACKGROUND

Phishing attacks are one of the most common security challenges that both individuals and organizations face in keeping their confidential information secure. Phishing attacks exploit human behavior through deception to gain access to organizational systems and personal information of users through electronic means. A phishing attack involves an attempt to acquire sensitive information such as login credentials, bank account information, credit card details, personal data, or any of an organization's confidential data often for malicious reasons, possibly by masquerading as a trustworthy entity.

A common type of phishing is an email phishing. Email phishing involves targeting one or more employees of an organization with malicious intent including covert collection of confidential data. Email phishing involves receiving message content that appears genuine, personal, or believable and may convince a user to act upon it. A typical phishing email may include a link and/or an attachment of malicious nature. The link when accessed may lead to a webpage that performs malicious actions or tricks the user into providing sensitive information or executing a malicious program. Similarly, the attachment when accessed, may execute a program that performs malicious actions. Malicious actions may include access to a system and/or network to collect data or to perform actions harmful to the normal functioning of a device or devices on a network in which email content was activated, or any other malicious actions capable of being performed by a program or a set of programs.

Phishing attackers may also targeted employees of organizations by executing security attacks through calendar invitations and appointments. A calendar invitation or appointment may include a link and/or an attachment of a malicious nature. Security attacks related to calendar invitations involve sending of calendar invitations (which are intended to resemble real meeting invitations) to targeted employees of an organization. The phishing attackers deceive the employees into believing the invitation is genuine and interacting with the calendar invitations. In an example, the calendar invitations may include malicious links masquerading as collaboration links for an employee to click on to start an online meeting, or phone numbers to call where the employee may be asked for personal and other information.

Organizations have recognized phishing as one of the most prominent threats that can cause a serious breach of data including confidential information. The phishing attackers who launch phishing attacks may attempt to evade an organization's security controls and target its employees. To prevent and/or to reduce the success rate of phishing attacks on employees, organizations may conduct security awareness training programs for their employees, along with other security measures. The organizations may operate security awareness training programs through their in-house cyber security teams or may utilize external entities who are experts in cyber security matters, to conduct security awareness training programs. Through the security awareness training, the organizations proactively educate their employees on how to spot and report a suspected phishing attack. As a part of a security awareness training program, an organization may send out simulated phishing emails periodically or occasionally to the devices of the employees and observe responses of the employees to such emails. A simulated phishing email is intended to resemble a real phishing email. The more genuine the simulated phishing email appears, the more likely an employee would respond to it. Security-conscious organizations may use simulated phishing attacks on their employees in order to train them to recognize traits and characteristics of real phishing attacks. The intent of the security awareness training programs is therefore to reduce the effectiveness of real phishing attacks that may jeopardize the security of the organizations.

Currently, organizations do not have mechanisms to conduct security awareness training for calendar-based threats. An example of a calendar-based threat may include a malicious calendar invitation. In an example, some or all of the content of a malicious calendar invitation may be of malicious nature. Examples of malicious content include, but are not limited to, a false (or fake) link to a web meeting application and a malicious 'pre-meeting survey' link or attachment. It is common that employees have may implicit trust in their electronic calendar applications. Further, employees may be less familiar with calendar-based threats (or calendar-based phishing attacks) and may not know how to examine or carefully inspect calendar-based threats for presence of potential security threats. As a result, the employees may become victims to calendar-based threats that may be of malicious nature and/or which may include malicious content, compromising security of the organizations. In an example, when an employee of an organization receives a malicious calendar invitation in his or her electronic calendar, the employee may not be able to identify a potential security threat associated with the malicious calendar invitation and may interact with it. Consequently, the organization may be at a security risk possibly leading to a breach of sensitive information of the organization.

SUMMARY

Systems and methods are described for facilitating user security awareness training for calendar-based threats. The systems and the methods relate to providing calendar-based simulated phishing attacks to users of an organization for imparting security awareness training pertaining to the calendar-based threats.

Systems and methods are provided for providing a calendar-based simulated phishing attack. In an example embodiment, a method for providing a calendar-based simulated phishing attack is described which includes identifying a context for the calendar-based simulated phishing attack directed towards a user, generating using the context, an electronic calendar invitation for the calendar-based simulated phishing attack, and communicating, the electronic calendar invitation to an electronic calendar of a user.

In some implementations, the method includes determining the context from information in one or more electronic calendars of the user, information about the user in one or more databases, and/or information from one or more emails associated with the user or from one or more mailboxes of the user.

In some implementations, the method includes determining content to include in the electronic calendar invitation based at least on the context.

In some implementations, the method includes determining a timing of communicating the electronic calendar invitation based at least on the context.

In some implementations, the method includes generating the electronic calendar invitation with one or more exploits.

In some implementations, the method includes detecting an interaction with the electronic calendar invitation by the user.

In some implementations, the method includes determining a risk score for the user based at least on the detection of the interaction with the electronic calendar invitation by the user.

In some implementations, the method includes communicating electronic training to the user based at least on the detection of the interaction with the electronic calendar invitation by the user.

In another example embodiment, a system for providing a calendar-based simulated phishing attack is described. The system includes one or more processors, coupled to memory and configured to: identify a context for the calendar-based simulated phishing attack directed towards a user; generate, using the context, an electronic calendar invitation for the calendar-based simulated phishing attack; and communicate the electronic calendar invitation to an electronic calendar of the user.

In some implementations, the one or more processors are configured to determine the context from information in one or more electronic calendars of the user, from information about the user in one or more databases, and/or from one or more emails associated with the user or from one or more mailboxes of the user.

In some implementations, based on the context, content to include in the electronic calendar invitation and/or a timing of communicating the electronic calendar invitation is determined.

In some implementations, the electronic calendar invitation is generated with one or more exploits.

In some implementations, an interaction with the electronic calendar invitation by the user is detected and a risk score is determined for the user based at least on the detection of the interaction with the electronic calendar invitation by the user.

In some implementations, electronic training is communicated to the user based at least on the detection of the interaction with the electronic calendar invitation by the user.

Other aspects and advantages of the invention will become apparent from the following detailed description, taken in conjunction with the accompanying drawings, which illustrate by way of example the principles of the invention.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for facilitating user security awareness training for calendar-based threats. In particular Section B describes systems and methods for providing calendar-based simulated phishing attacks to users of an organization for imparting security awareness training for calendar-based threats.

A. Computing and Network Environment

Figure 1A:
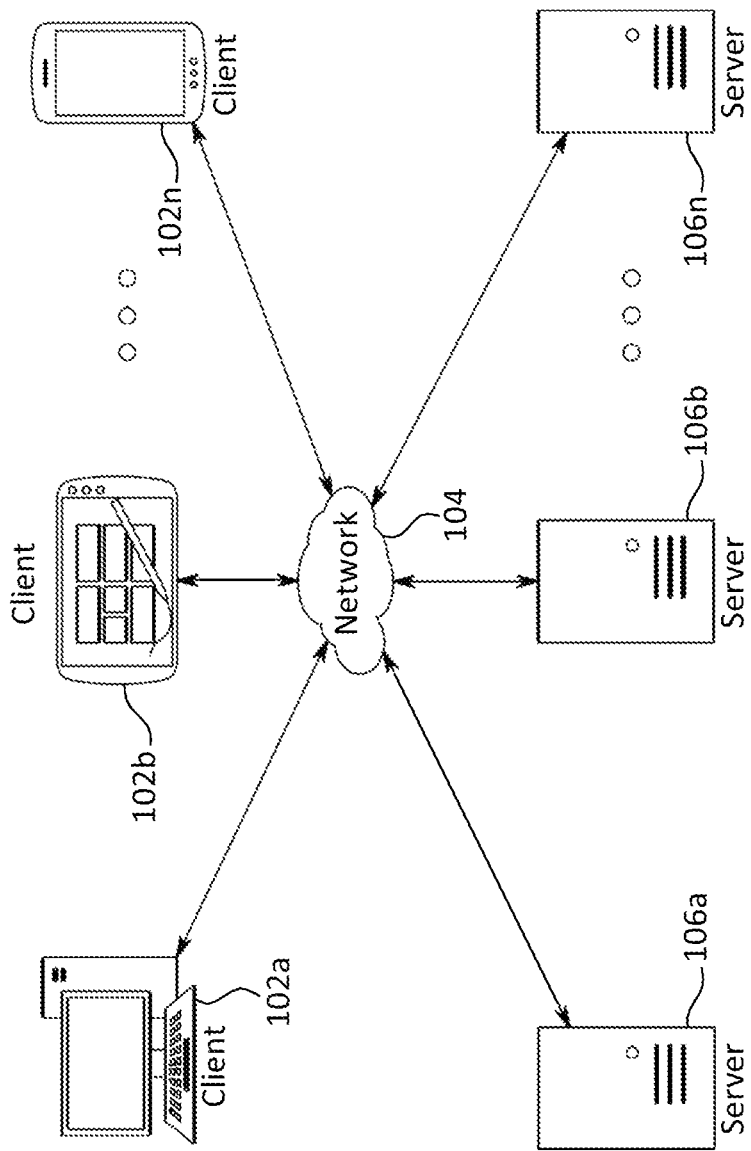
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s)

102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, Sigfox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
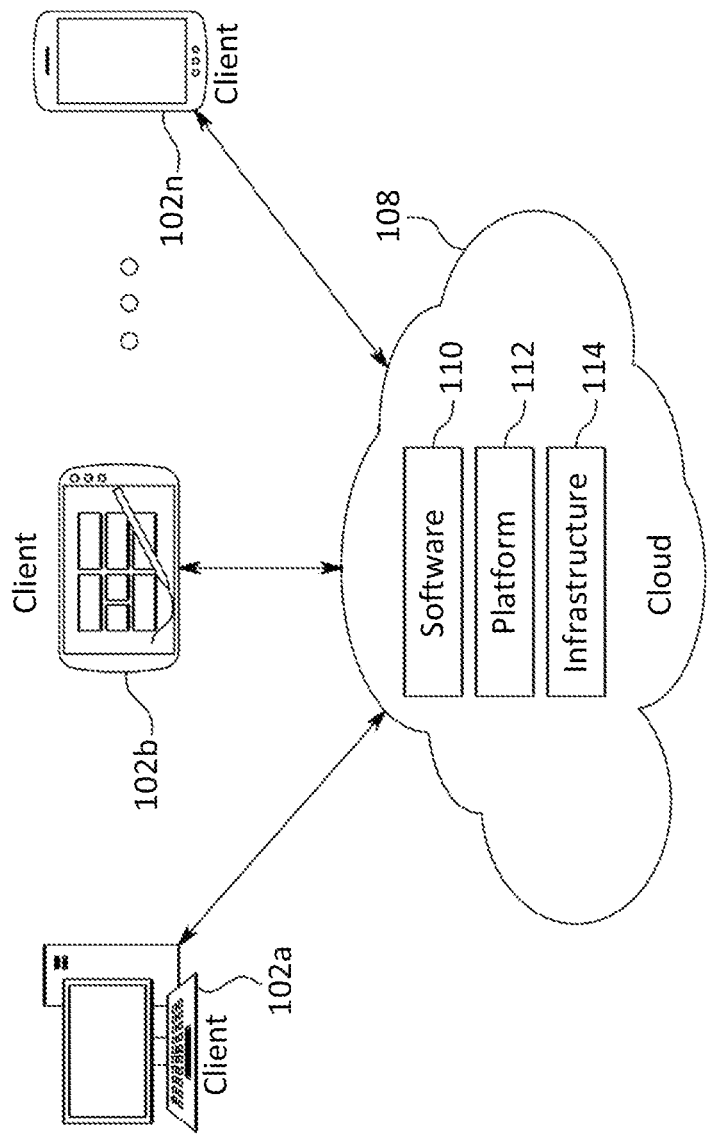
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
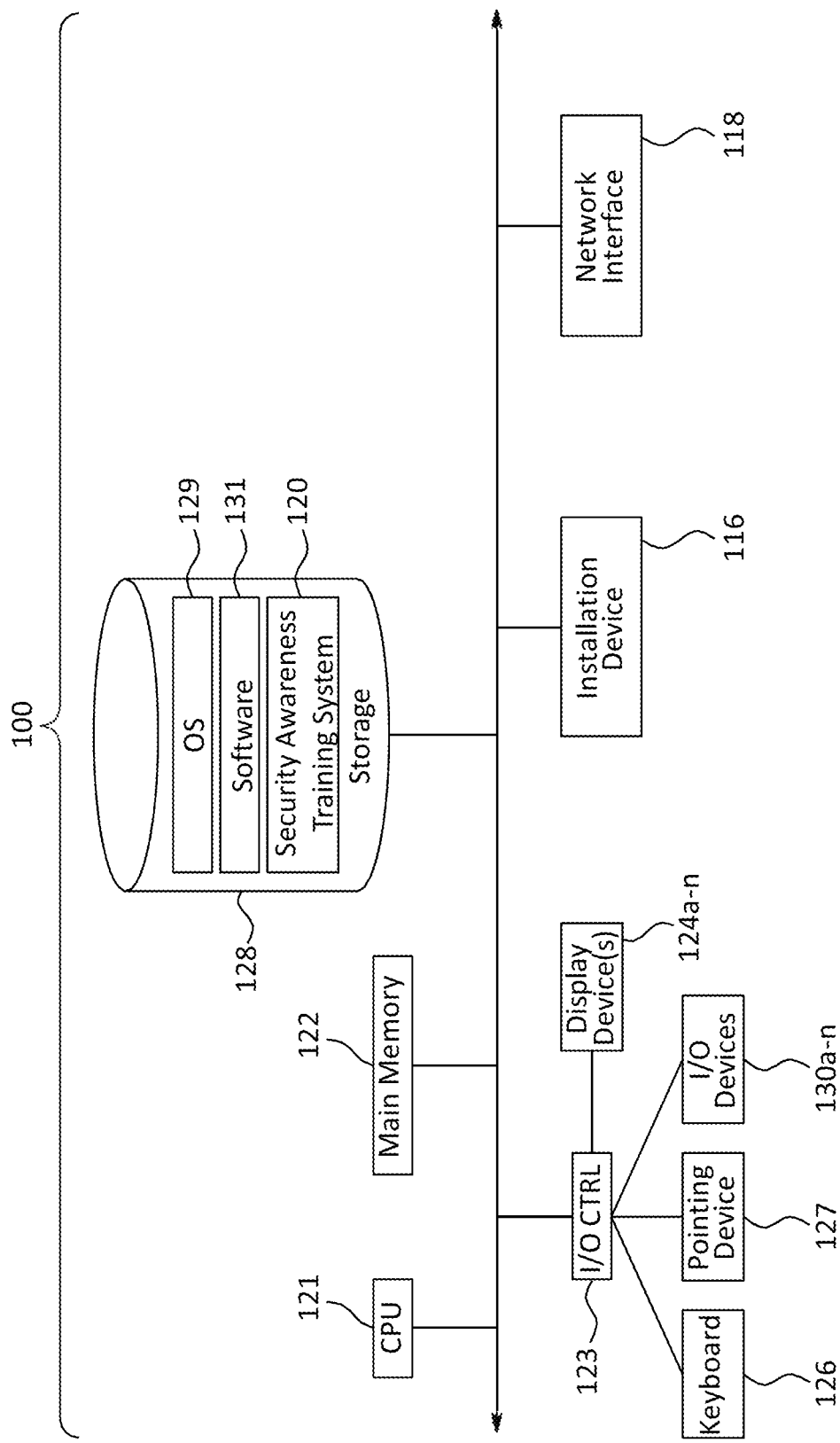
FIGS. 1C and 1D are block diagrams depicting embodiments of computing devices useful in connection with the methods and systems described herein, according to some embodiments.
Figure 1D:
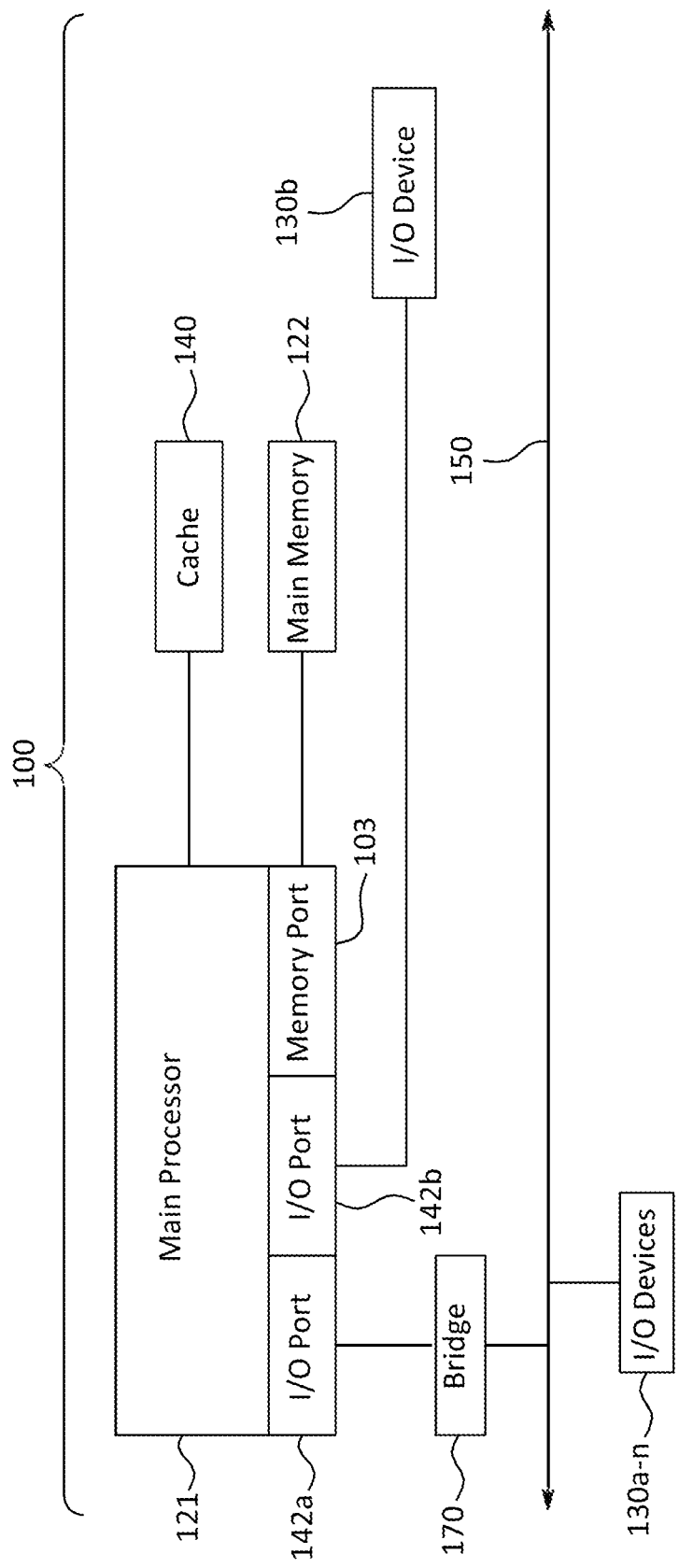

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness training system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuity that responds to and processes instructions fetched from main memory unit 122. In many embodiments, central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness training system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WIN- DOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Washington In other embodiments, computing device 100 is an eBook reader, e.g. the KINDLE family of devices by Amazon.com, or NOOK family of devices by Barnes & Noble, Inc. of New York City, New York.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for End-User Security Awareness Training for Calendar-Based Threats The following describes systems and methods for facilitating user security awareness training for calendar-based threats. In particular, the systems and the methods relate to providing calendar-based simulated phishing attacks to users of an organization for imparting security awareness training for calendar-based threats.

The systems and the methods of the present disclosure provide for creation and execution of simulated phishing campaigns using calendar-based simulated phishing attacks. In an example, a calendar-based simulated phishing attack may involve sending a simulated phishing calendar invitation (also referred to as an electronic calendar invitation or an electronic meeting invitation) to an electronic calendar of a user of an organization or inserting a calendar event into the electronic calendar of the user.

In an example, effectiveness of any simulated phishing attack in educating end-users of the organization may be a function of a count of users that actively interact with the simulated phishing attack. The effectiveness as a function of count of users is because the users who interact with the simulated phishing attack become aware of threat type and receive training as to risks that could be presented to the organization through their interaction with such phishing attacks. Simulated phishing attack effectiveness is therefore related to a likelihood of user interaction with the simulated phishing attack. This likelihood, in turn, may be related to a number of other factors such as how personally-relevant the simulated phishing attack is to a particular user, how urgent subject matter of the simulated phishing attack seems, or how realistic and believable content of the simulated phishing attack appears to be.

The systems and the methods of the present disclosure may either launch generic calendar-based simulated phishing attacks or may launch personalized calendar-based simulated phishing attacks that use additional information to tailor the calendar-based simulated phishing attacks towards a specific user (or a groups of users) and their individual circumstances.

The systems and the methods of the present disclosure leverage a security awareness training system that may identify suitable context for generating a highly relevant simulated phishing calendar invitation for a user that the user is more likely to interact with. In an example, the security awareness training system may determine the context from information about the user in one or more electronic calendars of the user. In some examples, the security awareness training system may determine the context from information about the user in one or more databases. In some examples, the security awareness training system may determine the context from information about the user in one or more emails or one or more mailboxes of the user. In an embodiment, information about the user included in the electronic calendar of the user may be referred to as calendar context information, or as context. Similarly, information about the user included in the one or more databases may be referred to as user context information, and information about the user included in the one or more emails associated with the user or in the one or more mailboxes of the user may be referred to as email context information. In an implementation, the security awareness training system may analyze the calendar context information, the user context information, and/or the email context information (collectively referred to as the context information) to identify the context for the simulated phishing calendar invitation directed towards the user. In an example, the context may be indicative of an appropriate contextual theme, contextual strategy and/or contextual content on which the simulated phishing calendar invitation may be based. In an example, the security awareness training system may use a deterministic algorithm (such as one that may be represented by a series of instructions within an executable program code) to identify the context from the context information. In some examples, the security awareness training system may use an Artificial Intelligence (AI) model or other Machine Learning (ML) models to identify the context from the context information.

In an implementation, the security awareness training system may identify one or more passion points of the user based on the context information. In an example, a passion point of a user may be understood as a matter that would entice the user to respond/react when presented with the matter. The security awareness training system may leverage the one or more passion points of the user to identify an effective context theme or context strategy for generating the simulated phishing calendar invitation.

The security awareness training system may generate the simulated phishing calendar invitation for the calendar-based simulated phishing attack using the context theme or strategy. In an implementation, the security awareness training system may generate the simulated phishing calendar invitation with one or more exploits (such as one or more simulated exploits) to use the generated simulated phishing calendar invitation for security awareness training purposes. In an example, the security awareness training system may add a link (such as to training materials via a landing page hosted by the security awareness training system) and/or an attachment (such as training materials) in the simulated phishing calendar invitation. The security awareness training system may then execute the calendar-based simulated phishing attack on the user, to test and improve cybersecurity awareness of the user. In an example, the security awareness training system may execute the calendar-based simulated phishing attack by communicating the simulated phishing calendar invitation to the electronic calendar of the user. In an example, the electronic calendar may be integrated into a calendar application that may be installed on a device of the user. The simulated phishing calendar invitation may serve a purpose of training the user to recognize calendar-based threats and also to gauge the security awareness of the user based on interaction of the user with the simulated phishing calendar invitation for further security awareness training.

In an implementation, the security awareness training system may place the simulated phishing calendar invitation into the electronic calendar of the user without any need of interaction of the user with the simulated phishing calendar invitation or the calendar application. In an example, on receiving the simulated phishing calendar invitation, the calendar application may automatically include the simulated phishing calendar invitation (for example, as a tentative entry) in the electronic calendar of the user without the user interacting with the calendar application or without the user having seen the simulated phishing calendar invitation. As the calendar application exhibits certain specific behaviors that are unique to handling of electronic calendar invitations, the systems and the methods of the present disclosure utilize the handling behaviors of the calendar application to impart security awareness training for calendar-based threats to the users of the organizations.

Figure 2:
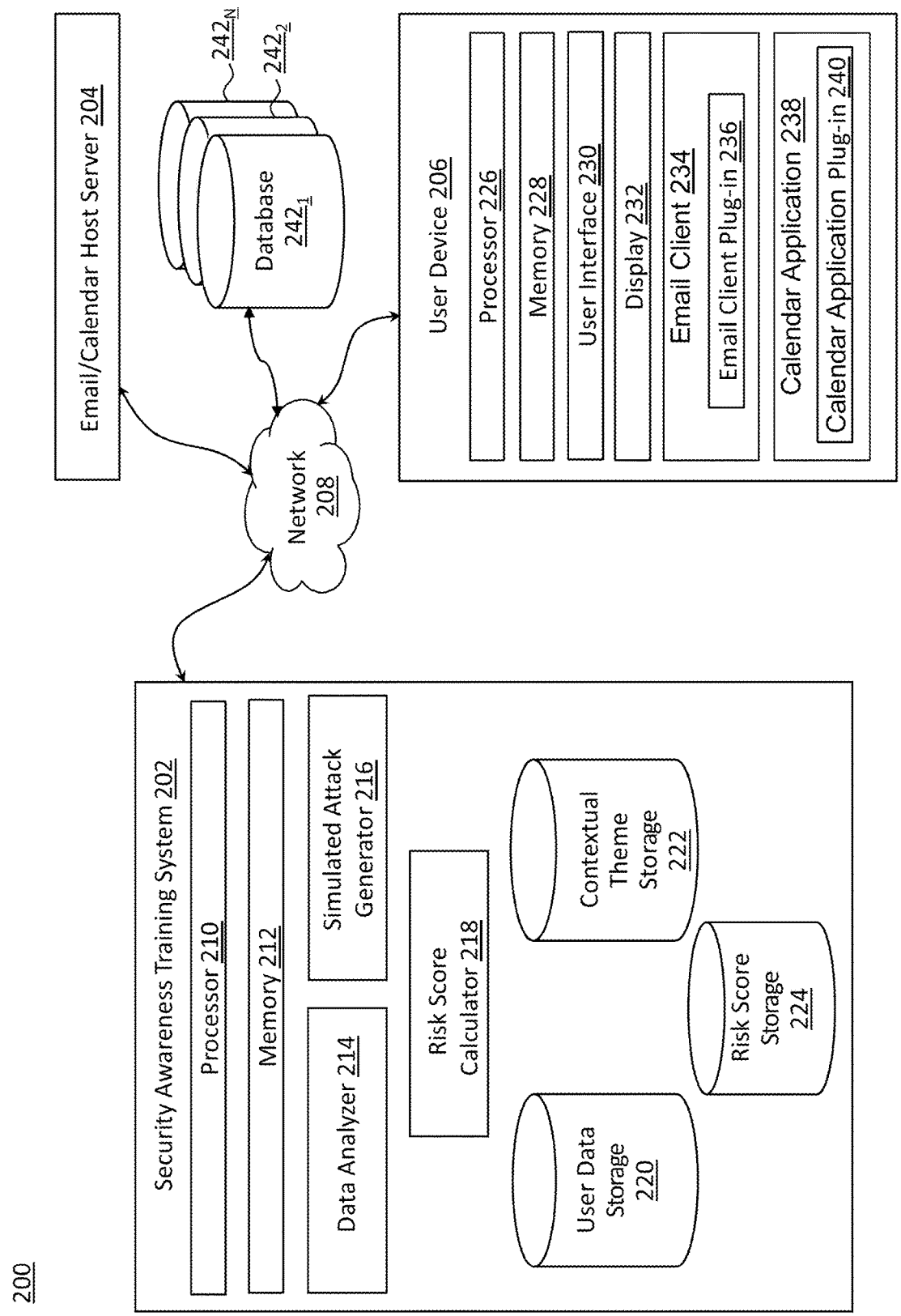
FIG. 2 depicts an implementation of some of the architecture of a system for providing calendar-based simulated phishing attacks, according to some embodiments.

FIG. 2 depicts an implementation of some of the architecture of system 200 for providing calendar-based simulated phishing attacks, according to some embodiments.

System 200 may include security awareness training system 202, email/calendar host server 204, user device 206, and network 208 enabling communication between the system components. Network 208 may be an example or instance of network 104, details of which are provided with reference to FIG. 1A and its accompanying description.

According to an embodiment, security awareness training system 202 may be implemented in a variety of computing systems, such as a mainframe computer, a server, a network server, a laptop computer, a desktop computer, a notebook, a workstation, and any other computing system. In an implementation, security awareness training system 202 may be communicatively coupled with email/calendar host server 204 and user device 206 through network 208 for exchanging information. In an implementation, security awareness training system 202 may be implemented in a server, such as server 106 shown in FIG. 1A. In some implementations, security awareness training system 202 may be implemented by a device, such as computing device 100 shown in FIGS. 1C and 1D.

In an example, security awareness training system 202 may be a Computer Based Security Awareness Training (CBSAT) system that performs security services such as performing simulated phishing attacks on a user or a set of users of an organization as a part of security awareness training. The user may be an employee of the organization. In an example, security awareness training system 202 may provide the security awareness training to the users for calendar-based threats. Security awareness training system 202 may be owned or managed or otherwise associated with the organization or any entity authorized thereof. In an implementation, security awareness training system 202 may operate in close coordination with email/calendar host server 204 such that security awareness training system 202 may read and/or write to electronic calendars and/or mailboxes of the users of the organization to determine information about the users. In an implementation, security awareness training system 202 may communicate with email/calendar host server 204 through an Application Programming Interface (API) to gain access to the electronic calendars and/or the mailboxes of the users.

Further, in some embodiments, security awareness training system 202 may include processor 210 and memory 212. For example, processor 210 and memory 212 of security awareness training system 202 may be CPU 121 and main memory 122 respectively as shown in FIGS. 1C and 1D. Further, security awareness training system 202 may include data analyzer 214, simulated attack generator 216, and risk score calculator 218. In an implementation, data analyzer 214, simulated attack generator 216, and risk score calculator 218 may be coupled to processor 210 and memory 212. In some embodiments, data analyzer 214 may be an application or a program that determines/obtains information about the users and analyzes the information to identify suitable contexts or themes for calendar-based simulated phishing attacks directed to the users. In an example, data analyzer 214 may determine an information about a user based on one or more electronic calendars of the user. In an implementation, data analyzer 214 may use an Artificial Intelligence (AI) algorithm or other Machine Learning (ML) algorithms to determine the information about the user. In some examples, data analyzer 214 may determine the information about the user from one or more databases $242_{1-N}$. In some examples, data analyzer 214 may determine the information about the user based on one or more emails associated with the user or based on one or more mailboxes of the user. The one or more mailboxes may be part of email host server 204.

In some embodiments, simulated attack generator 216 may be an application or a program that manages various aspects of a calendar-based simulated phishing attack including, for example, generating, tailoring, and/or executing a calendar-based simulated phishing attack. A calendar-based simulated phishing attack may test readiness of a user to handle calendar-based phishing attacks such that malicious actions are prevented. For instance, simulated attack generator 216 may monitor and control timing of various aspects of calendar-based simulated phishing attacks, process requests for access to results of the calendar-based simulated phishing attacks, and/or perform other tasks related to the management of the calendar-based simulated phishing attacks. In an example, the calendar-based simulated phishing attack may interchangeably be referred to as a calendar-based security attack or a simulated attack. According to an implementation, simulated attack generator 216 may be configured to generate a simulated phishing calendar invitation. In an example, the simulated phishing calendar invitation may interchangeably be referred to an electronic calendar invitation or an electronic calendar-based invitation or a calendar event or an appointment. The simulated phishing calendar invitation may be used in the calendar-based simulated phishing attack. In some implementations, risk score calculator 218 may be an application or a program that determines risk scores for the users. A risk score of a user may be a representation of vulnerability of the user to a malicious attack.

Referring back to FIG. 2, in some embodiments, security awareness training system 202 may include user data storage 220, contextual theme storage 222, and risk score storage 224. In an implementation, user data storage 220 may store information related to users of an organization. In an example, user data storage 220 may store user data, corporate personal records, corporate address lists, and details of the organization's internal employee hierarchy or reporting structures. In some examples, user data storage 220 may also store personal information of the users. Security awareness training system 202 may obtain information related to users from one or more database $242_{1-N}$ and may store the information in user data storage 220. One or more databases $242_{1-N}$ may include comprising corporate personal records, corporate address lists or details of the organization's internal employee hierarchy or reporting structures. In some embodiments, one or more databases $242_{1-N}$ may be databases that are outside of the organization and may include social networking sites. In an implementation, contextual theme storage 222 may store a plurality of contextual themes. In an implementation, risk score storage 224 may store risk scores of users of an organization. Security awareness training system 202 may periodically or dynamically update the information related to the users stored in user data storage 220, the plurality of contextual themes stored in contextual theme storage 222, and the risk scores of the users stored in risk score storage 224. Although, it has been shown that user data storage 220 is implemented within security awareness training system 202, in some implementations, user data storage 220 may be implemented outside security awareness training system 202. For example, user data storage 220 may be implemented on a corporate server or an active directory, and user data storage 220 may be queried, for example, using a Lightweight Directory Access Protocol (LDAP).

According to some embodiments, email/calendar host server 204 may be any server capable of exchanging information/data over network 208. In an implementation, email/calendar host server 204 may be a server, such as server 106 shown in FIG. 1A. Email/calendar host server 204 may be implemented by a device, such as computing device 100 shown in FIGS. 1C and 1D. In some embodiments, email/calendar host server 204 may be implemented as a part of a cluster of servers. In some embodiments, email/calendar host server 204 may be implemented across a plurality of servers, thereby, tasks performed by email/calendar host server 204 may be performed by the plurality of servers. These tasks may be allocated among the cluster of servers by an application, a service, a daemon, a routine, or other executable logic for task allocation. In an implementation, email/calendar host server 204 may be communicatively coupled with security awareness training system 202 and user device 206 through network 208 for exchanging information. In an implementation, email/calendar host server 204 may be owned or managed or otherwise associated with an organization or any entity authorized thereof. In an implementation, email/calendar host server 204 may be a cloud-based server. In some implementations, email/calendar host server 204 may be locally hosted. Known examples of email/calendar host server 204 include Microsoft® Exchange Server, and HCL Domino®. In an implementation, email/calendar host server 204 may provide one or more defined APIs (or API surfaces) that may allow an authorized access to electronic calendars and/or mailboxes of users of the organization. In an example, the API may be Microsoft® Graph API designed to enable access to cloud-based resources. Other examples of email/calendar host server 204 and corresponding supported APIs are contemplated herein. In an implementation, security awareness training system 202 may be provided authorized access to email/calendar host server 204 to access the electronic calendars and/or the mailboxes of the users.

In some embodiments, user device 206 may be any device used by a user. The user may be an employee of an organization or any entity. User device 206 as disclosed, may be any computing device, such as a desktop computer, a laptop, a tablet computer, a mobile device, a Personal Digital Assistant (PDA) or any other computing device. In an implementation, user device 206 may be a device, such as client device 102 shown in FIGS. 1A and 1B. User device 206 may be implemented by a device, such as computing device 100 shown in FIGS. 1C and 1D.

According to some embodiments, user device 206 may include processor 226 and memory 228. In an example, processor 226 and memory 228 of user device 206 may be CPU 121 and main memory 122, respectively, as shown in FIGS. 1C and 1D. User device 206 may also include user interface 230 such as a keyboard, a mouse, a touch screen, a haptic sensor, voice-based input unit, or any other appropriate user interface. It shall be appreciated that such components of user device 206 may correspond to similar components of computing device 100 in FIGS. 1C and 1D, such as keyboard 126, pointing device 127, I/O devices 130a-n and display devices 124a-n. User device 206 may also include display 232, such as a screen, a monitor connected to the device in any manner, or any other appropriate display. In an implementation, user device 206 may display a received message for the user using display 232 and is able to accept user interaction via user interface 230 responsive to the displayed message.

Referring again to FIG. 2, in some embodiments, user device 206 may include email client 234. In an implementation, email client 234 may be an application installed on user device 206. In some implementations, email client 234 may be an application that can be accessed over network 208 through a browser without requiring any installation on user device 206. In an implementation, email client 234 may be any application capable of composing, sending, receiving, and reading emails. For example, email client 234 may be an instance of an application, such as Microsoft Outlook™ application, Lotus Notes® application, Apple Mail® application, Gmail® application, or any other known or custom email application. In an example, a user of user device 206 may select, purchase and/or download email client 234, through for example, an application distribution platform. The term "application" may refer to one or more applications, services, routines, or other executable logic or instructions.

Email client 234 may include email client plug-in 236. In some implementations, email client plug-in 236 may not be implemented in email client 234 but may coordinate and communicate with email client 234. Further, in an implementation, email client 234 may communicate with email client plug-in 236 over network 208. According to one or more embodiments, email client plug-in 236 is an interface local to email client 234 that enables email client users, i.e., recipients of emails, to select to report suspicious emails that they believe may be a threat to them or their organization. Other implementations of email client plug-in 256 not discussed here are contemplated herein. An email client plug-in may be an application program that may be added to an email client for providing one or more additional features to enable customization. The email client plug-in may be provided by the same entity that provides the email client software, or may be provided by a different entity. In an example, email client may include plug-ins providing a User Interface (UI) element such as a button to trigger a function. Functionality of email client plug-ins that use a UI button may be triggered when a user clicks the button. Some examples of email client plug-ins that use a button UI include but are not limited to, a Phish Alert Button (PAB) plug-in, a task create plug-in, a spam marking plug-in, an instant message plug-in and a search and highlight plug-in.

In examples, further types of email client plug-ins that highlight portions of email may scan the content of the email for specific content.

Referring back to FIG. 2, email client plug-in 236 may be any of the aforementioned types, or may be of any other type. In one example, email client plug-in 236 may provide a PAB plug-in button through which functions or capabilities of email client plug-in 236 are triggered/activated by a user action on the button. Upon activation, email client plug-in 236 may forward an email (for example, a suspicious email) to a security administrator. In some embodiments, email client plug-in 236 may cause email client 234 to forward an email or a copy of the email to a threat detection platform or an Incident Response (IR) team of the organization for threat triage or threat identification. In some embodiments, email client 234 or email client plug-in 236 may send a notification to security awareness training system 202 that a user has reported an email received at user's mailbox as potentially malicious. Therefore, the PAB plug-in button enables a user to report a suspicious email. In an implementation, the PAB plug-in button may be implemented in an email menu bar of email client plug-in 236. In some implementations, the PAB plug-in button may be implemented in a ribbon area of email client plug-in 236. Other implementations of the PAB plug-in button within the email client are contemplated herein.

In some embodiments, user device 206 may include calendar application 238. In an implementation, calendar application 238 may be a stand-alone application installed on user device 206. In an example implementation, calendar application 238 may interact with email client 234. In some implementations, calendar application 238 may be an application that can be accessed over network 208 through a browser without requiring any installation on user device 206. In an implementation, one or more electronic calendars may be integrated into calendar application 238. The one or more electronic calendars may facilitate the user to schedule meetings, fix appointments, set up reminders for a task and organize day to day activities. In some embodiments, the one or more electronic calendars may facilitate the user to schedule meetings based on emails that the user receives and/or send calendar invitations (or meeting invitations) to other users. In an implementation, the one or more electronic calendars may include a functionality to provide alert reminders or updates to users on upcoming meetings. Examples of calendar application 238 include Gmail®/ Google calendar® (often referred to as part of the "G-suite"), Microsoft Outlook™ mail/calendar (for example, as a part of Microsoft® Office 365 product offering) and so forth. In an example, a user of user device 206 may select, purchase and/or download calendar application 238, through for example, an application distribution platform. The term "application" may refer to one or more applications, services, routines, or other executable logic or instructions.

In some embodiments, calendar application 238 may provide Application Programming Interfaces (APIs) or other methods that allow calendar entries to be made completely outside of any user-facing email or calendar application. For example, calendar application 238 may automatically add new tentative entries to a user's schedule in response to a received calendar invitation regardless of whether the user interacts with the calendar invitation or not. In some embodiments, calendar application 238 may include calendar application plug-in 240. In one example, calendar application plug-in 240 may provide a PAB plug-in button through which functions or capabilities of calendar application plug-in 240 are triggered/activated by a user action on the button. The PAB plug-in button may allow for an email including a suspicious calendar invitation to be reported. In one example implementation, the PAB plug-in button may be implemented in a ribbon area of calendar application 238.

In some implementations, calendar application 238 including calendar application plug-in 240 may be integrated in email client 234 or be a part of email client 234. In some embodiments, calendar application 238 (without calendar application plug-in 240) may be integrated in email client 234 or be a part of email client 234 such that functionality of email client plug-in 236 may be extended or enhanced to allow reporting not only of suspicious emails, but also of suspicious calendar invitations or of emails including suspicious calendar invitations. In such scenarios, the PAB plug-in button may be implemented in a calendar menu bar or a ribbon area in addition to an email menu bar. Other example implementations of the PAB plug-in button not discussed here are contemplated herein.

In operation, whenever an organization wishes to provide security awareness training to users of the organization to help mitigate risks associated with calendar-based threats (for example, calendar-based security attacks), the organization may implement security awareness training system 202. The organization may implement security awareness training system 202 in-house or use a third-party entity to implement security awareness training system 202. Security awareness training system 202 may communicate with email/calendar host server 204 using one or more defined APIs (known as an API surface) to access electronic calendars and/or mailboxes of one or more users of the organization. In various embodiments, a user may be understood as an employee or a contractor or anyone who works for the organization.

In an implementation, security awareness training system 202 may generate a link and send the link to email/calendar host server 204 to obtain appropriate permissions (for example, to read and write to one or more electronic calendars and/or one or more mailboxes of the one or more users of the organization). In an example, the link may indicative of a permissions access request. Responsive to receiving the link (permissions access request) from security awareness training system 202, email/calendar host server 204 may grant permissions to security awareness training system 202. In an example, the permissions may allow security awareness training system 202 to read from the one or more electronic calendars, one or more databases $242_{1-N}$, and/or one or more email clients and one or more mailboxes of the users. In some examples, the permissions may allow security awareness training system 202 to insert calendar events for a single user or for multiple users within a group (for example, in a batch fashion or directed towards a specified user group).

In some embodiments, subsequent to obtaining appropriate permissions from email/calendar host server 204, data analyzer 214 may access the one or more electronic calendars, the one or more databases $242_{1-N}$, and/or the one or more emails and the one or more mailboxes of a user of the organization to determine and obtain information about the user. In an implementation, data analyzer 214 may obtain the information about the user from various information sources, such as the one or more electronic calendars of the user, the one or more databases $242_{1-N}$, the one or more emails associated with the user and the one or more mailboxes of the user. The information about the user determined from the various information sources may interchangeably be referred to as a user-specific information. Data analyzer 214 may analyze the information about the user to identify/determine context from the information about the user. In an example, data analyzer 214 may identify/determine a context from the information about the user in the one or more electronic calendars of the user. In some examples, data analyzer 214 may identify/determine a context from the information about the user in the one or more databases $242_{1-N}$. In some examples, data analyzer 214 may identify/determine a context from information about the user from the one or more emails associated with the user or from the one or more mailboxes of the user. In an embodiment, information about the user included in the one or more electronic calendars of the user may be referred to as calendar context information. Similarly, information about the user included in the one or more databases $242_{1-N}$ may be referred to as user context information, and information about the user included in the one or more emails associated with the user or in the one or more mailboxes of the user may be referred to as email context information. The one or more electronic calendars, the one or more mailboxes, and the one or more databases $242_{1-N}$, may hereinafter be referred to as the electronic calendar, the mailbox, and the database, respectively, for the sake of brevity.

In an example, the information about the user in the electronic calendar of the user may include information about entries (for example, the user's schedule) in the electronic calendar of the user. In some examples, the information may include open/blocked time segments and/or day segments in the user's schedule. For example, the information in the electronic calendar may include information about the time segments and/or the day segments that are always available, or always unavailable, or always marked as "out of office", or always marked as "not a part of working hours", etc. In some examples, the information obtained from the electronic calendar of the user may include a frequency of meetings in the user's schedule. For example, the frequency may be indicative of a percentage occupation of the user (i.e., how many hours in a day does the user has meetings). The frequency may be considered to be specific to a day of a week, for example, on which day of the week the user has most number of meetings (i.e., the user is most occupied) and on which day of the week the user has least number of meetings (i.e., the user is least occupied).

In some examples, the information about the user obtained from the electronic calendar may include titles of meetings, descriptions of the meetings, invitees to the meetings, previous meetings, durations of the previous meetings, and schedules of recurring meetings. In an example, the information may also include information about other characteristics of the meetings, such as general durations of the meetings that start on a given hour. For example, the user may tend to schedule 45 minutes meetings that start on the hour. In some examples, the information about the user obtained from the electronic calendar may include knowledge of the user's schedule, for example to hide a meeting among other meetings or to create the invitation to be at/around the same time as other legitimate meetings in the user's electronic calendar.

In an example, the information about the user in the database (for example, user data storage 220) may include information such as user data, corporate personal records, corporate address lists or details of organization's internal employee hierarchy or reporting structures. In an example, the database (for example, user data storage 220) may also include personal information of the user. For example, the information about the user obtained from the database may include information about relationships of the user, for example, with his or her family members, friends, coworkers, peers etc. In some examples, the information about the user may include information about a work hierarchy of the user (for example, a manager, a subordinate, a peer, a team, a location, a role, etc.). In some examples, the information about the user may include names and contact information of individuals known to the user.

In an implementation, data analyzer 214 may operate one or more Artificial Intelligence (AI) processes to monitor the information about the user included in the one or more emails associated with the user or in the mailbox of the user. In an example, the information obtained from the mailbox of the user may include information related to message threads or conversations, message subject titles, email headers, message body text, message body images, message senders, message recipients, group distributions lists, message attachments, and existing emails (for example, one or more emails associated with the user) within the user's mailbox.

Data analyzer 214 may analyze the calendar context information, the user context information, and/or the email context information to identify a context for a calendar-based simulated phishing attack (such as a simulated phishing calendar invitation) directed towards the user. In an example, the context may be indicative of an appropriate contextual theme, contextual strategy and content on which the calendar-based simulated phishing attack may be based. In an embodiment, data analyzer 214 may use a deterministic algorithm (such as one that may be represented by a series of instructions within an executable program code) to identify the context from the calendar context information, the user context information, and/or the email context information (collectively referred to as the context information) for a calendar-based simulated phishing attack. In some embodiments, data analyzer 214 may use an AI model or other ML models to identify the context from the context information. In an implementation, data analyzer 214 may operate AI processes to identify a suitable situation from which a user-specific context or a contextual theme for the calendar-based simulated phishing attack may be derived.

In an implementation, data analyzer 214 may analyze the context information to identify specific keywords or terms that may be frequently used, or which may be industry-specific. In some implementations, data analyzer 214 may also analyze the context information to identify individuals that are participants in other meetings within the user's electronic calendar, or to identify individuals that are common senders or recipients of emails present in the user's mailbox (such as in inbox and/or other mail folders).

In an implementation, to maximize effectiveness of the calendar-based simulated phishing attack (i.e., likelihood of user interaction with the calendar-based simulated phishing attack in any way), data analyzer 214 may identify one or more passion points of the user based on the context information. In an example, a passion point of a user may be understood as anything that would entice the user to respond/react when presented with the matter. In an example, the one or more passion points of the user identified by data analyzer 214 may entice the user to interact with the calendar-based simulated phishing attack.

Upon identification of the one or more passion points of the user, data analyzer 214 may identify a contextual theme for the calendar-based simulated phishing attack based on the one or more passion points of the user. In some implementations, data analyzer 214 may not use (or partly use) the context information to identify the contextual theme. In such scenarios, data analyzer 214 may select a contextual theme from amongst a plurality of contextual themes stored in contextual theme storage 222. In an example, the plurality of contextual themes may include generic themes, for example, those which may be widely applicable to a particular industry type or to a range of industries to which the organization belongs and which may be commonly expected by most users of the organization. In an example, the contextual theme identified or selected by data analyzer 214 may include one of a special occasion (for example, welcome parties, farewells, weddings, graduations, briefings, emergency meetings), recognition of the user (for example, through awards, certifications, gifts, prizes, speaking engagements, panelist positions, journal article acceptance, etc.), a simulated benefits enrollment meeting, a holiday party, a blood drive, and/or similar employee-wide meetings.

According to an implementation, simulated attack generator 216 may generate an electronic calendar invitation for the calendar-based simulated phishing attack using the context. In an example, simulated attack generator 216 may use the identified keywords, terms, and/or individuals to generate the electronic calendar invitation. In an implementation, simulated attack generator 216 may determine content to include in the electronic calendar invitation based at least on the context. In an example, simulated attack generator 216 may create suitable subject lines, body text, attachments, or links based on the context. In an example, the electronic calendar invitation generated by simulated attack generator 216 may include content that provides a user-specific or a group specific context. In an example, the content providing the user-specific or the group-specific context may include, for example, a relevant subject or title (such as a project or product name). Accordingly, the electronic calendar invitation when delivered to a group of users who are known to each other (such as a team responsible for delivery of the project or product) may appear to be genuine. Further, in an example, use of content providing the user-specific or the group specific context in the electronic calendar invitation may increase the likelihood of the user interacting with the electronic calendar invitation.

In an example, simulated attack generator 216 may identify or select a relevant email thread within the user's mailbox and may generate the electronic calendar invitation in which the subject of the invite is copied (or is otherwise derived from) the subject of the email thread, or a filename of an attachment is copied (or is otherwise derived from) a filename of an attachment in the email thread. As a result, the electronic calendar invitation to the user may appear to be a response to a current/known email thread. In some examples, simulated attack generator 216 may identify an email exchange regarding an editing of a project document. Based on the identification, simulated attack generator 216 may subsequently use a title of the project document in a subject line of the electronic calendar invitation. In an example, simulated attack generator 216 may also include an attachment to the project document, or an attachment to that appears to be the project document. In some examples, the information obtained from the electronic calendar of the user may include information about the user's schedule, for example, to hide a meeting among other meetings. In an implementation, simulated attack generator 216 may generate the electronic calendar invitation to be at or around the same time as other legitimate meetings in the user's electronic calendar. In an implementation, simulated attack generator 216 may generate the electronic calendar invitation to be at a different time that is not at or not around other legitimate meetings in the user's electronic calendar.

According to some embodiments, simulated attack generator 216 may generate the electronic calendar invitation with one or more exploits (such as one or more simulated exploits) to use the generated electronic calendar invitation for security awareness training purposes. In examples, exploits include benign elements that are implemented in a simulated calendar-based attack. In some implementations, simulated attack generator 216 may add one or more benign elements in the electronic calendar invitation that may be used to deliver security awareness training to the user. In an example, the one or more benign elements may include one or more of links, attachments, or other content. In an example, a benign element of an electronic calendar invitation may mimic characteristics of a malicious element. That is, the benign element may maintain the same look and feel as the malicious element but does not cause any harm to a user (or a recipient) of the electronic calendar invitation. Instead, the benign element may test the user's security awareness levels. Examples of a malicious element include, but are not limited to, a false (or fake) link to a web meeting application (for example, WebEx™, Skype™, GoToMeeting™, BlueJeans™, Google™ Meetings etc.), a malicious 'pre-meeting survey' link or attachment, a malicious link or attachment that appears to include important background/preparation materials or additional details for meeting, a false link pointing to a YouTube™ video or other video, a false link including international/alternate telephone numbers, clickable logos or other items likely to be trusted by a user, a malicious macro embedded in a calendar event or a calendar invitation, a calendar event attachment that may be received via an email (for example, ".ics", ".ical", ".ifb", ".icalendar", ".vcs", ".bcc", or ".cal" file attachment types) that has a malicious link in calendar event description, or a malicious calendar event attachment received by a user via non-email means such as via Short Message Service (SMS), Facebook™ messenger, or WhatsApp™. Based on the user's interaction/reaction or response to the benign element, security awareness training system 202 may determine security awareness training requirements for the user.

In an implementation, simulated attack generator 216 may add a link (such as to training materials via a landing page hosted by security awareness training system 202) and/or an attachment (such as training materials) to the electronic calendar invitation. In some examples, the generated electronic calendar invitation may appear as if it has been accepted by one or more users (such as meeting invitees) that the electronic calendar invitation was sent to. For example, a schedule-tracking information panel of calendar application 238 may display one or more of the meeting invitees having accepted the electronic calendar invitation. In an implementation, simulated attack generator 216 may embed or insert benign content in the electronic calendar invitation. In an example, the benign content may be embedded or inserted in the electronic calendar invitation in different ways. For example, simulated attack generator 216 may embed or insert the benign content within the electronic calendar invitation itself, or within an email associated with the electronic calendar invitation, or within an email used to deliver/communicate the electronic calendar invitation. In an example, the benign content may facilitate the delivery of the security awareness training to the user in response to the user interaction with the electronic calendar invitation.

In some embodiments, simulated attack generator 216 may determine a timing of communicating the electronic calendar invitation to the user based at least on the context. In an example, the electronic calendar invitation may appear to be more genuine if a compelling time of communicating the electronic calendar invitation to the user is set or determined. In an example of such timing optimization, simulated attack generator 216 may instill/impart a sense of urgency in a tone of the electronic calendar invitation to increase the likelihood of user interaction with the electronic calendar invitation. In an example, a sense of urgency may be instilled/imparted in an electronic calendar invitation for a calendar event by sending the electronic calendar invitation to end-user(s) just before the calendar event takes place. Other ways of instilling/imparting a sense of urgency include setting or adding an urgent notification or a flag, or including text that may indicate to an end-user that he or she is running late for a scheduled meeting (for example, with the help of calendar reminder pop ups, use of multi-vector reminders such as sending of emails, other calendar invites or reminders, Short Message Service (SMS) messages, and any other methods of delivering reminders). A pop up may be understood to refer to the appearance of graphical or textual content on a display.

In an implementation, simulated attack generator 216 may communicate the electronic calendar invitation to the user. In an example, simulated attack generator 216 may communicate the electronic calendar invitation to the user via an email. In some examples, simulated attack generator 216 may insert the electronic calendar invitation directly into the electronic calendar of the user. Accordingly, the user may receive the electronic calendar invitation into his or her electronic calendar and/or the mailbox. In some examples, the electronic calendar invitation may be added to the electronic calendar of the user irrespective of whether the user interacted or not with the electronic calendar invitation. In some implementations, a calendar entry may be created and inserted into the electronic calendar outside of the user-facing calendar application or email application.

In an example, the electronic calendar invitation may have a scheduled event time that does not overlap with other preexisting appointments within the electronic calendar of the user. In some examples, the electronic calendar invitation may have a scheduled event time that overlaps with other preexisting appointments within the electronic calendar of the user. In some examples, simulated attack generator 216 may communicate the electronic calendar invitation at a time that is within a predetermined time (for example, 5 minutes) before a scheduled event time included in the electronic calendar invitation. Such strategic timing for communicating the electronic calendar invitation to the user may impose a sense of urgency (for example, the user may believe himself or herself to be late for the meeting or the user may need to rush to the meeting) and increase a likelihood that the user will interact with the electronic calendar invitation. In some implementations, the electronic calendar invitation may have a scheduled event time that does not overlap or come close to the time of other preexisting appointments within the electronic calendar of the user. This may pique the curiosity of the user because of the unusual time, and increase a likelihood that the user will interact with the electronic calendar invitation In some implementations, simulated attack generator 216 may detect an interaction with the electronic calendar invitation by the user. In an example, on receiving the electronic calendar invitation or on becoming aware of presence of the electronic calendar invitation in the electronic calendar (for example, by viewing upcoming events), the user may interact with the electronic calendar invitation. In an example, the user may interact with one or more of the links, the attachments, or other content (such as benign content) that the electronic calendar invitation may include. In an implementation, on receiving the electronic calendar invitation, the user may process or handle the electronic calendar invitation in one or more ways. For example, the user may interact with electronic calendar invitation by accepting or tentatively accepting the electronic calendar invitation, declining the electronic calendar invitation, proposing a new meeting time, clicking on a link in the electronic calendar invitation, opening/downloading an attachment in the electronic calendar invitation, forwarding the electronic calendar invitation to other users, and deleting the electronic calendar invitation. In an example, the user may interact with one or more benign content types within the electronic calendar invitation. The interaction with the benign content types may facilitate delivery of the security awareness training to the user.

In an implementation, simulated attack generator 216 may determine whether the user passes or fails one or more aspects of the calendar-based simulated phishing attack (i.e., a simulated security test). In some examples, the user may fail the calendar-based simulated phishing attack if the user interacts with the electronic calendar invitation in any way. As previously described, the user may interact with the electronic calendar invitation by accepting or tentatively accepting the electronic calendar invitation, declining the electronic calendar invitation, proposing a new meeting time, clicking on a link in the electronic calendar invitation, opening/downloading an attachment in the electronic calendar invitation, and forwarding the electronic calendar invitation to other users. In some examples, deletion of the electronic calendar invitation by the user may also be considered as a user interaction. In an example, when a user clicks on a link in the electronic calendar invitation, the user may be redirected to a landing page that may be a replica of a web meeting application (for example, Zoom™, GoToMeeting™ etc.) and the user may be asked to download meeting application software so that the user can join a meeting. When the user chooses to download the meeting application software (for example, by clicking on an install/download link), the user may be deemed to have been tricked by the exploit and therefore, may have deemed to have failed the calendar-based simulated phishing attack.

In some examples, the user may pass the calendar-based simulated phishing attack when the user ignores the electronic calendar invitation or reports the electronic calendar invitation. In an example, on receiving the electronic calendar invitation, if the user suspects that the electronic calendar invitation is potentially malicious, the user may report the electronic calendar invitation using calendar application plug-in 240. In an implementation, calendar application plug-in 240 may provide a UI element such as the PAB in calendar application 238 of user device 206. In an example, when the user receives the electronic calendar invitation and the user suspects that the electronic calendar invitation is potentially malicious, then the user may click on the UI element such as a button, using for example, a mouse pointer to report the electronic calendar invitation. In some implementations, when the user selects to report, via the UI element, the electronic calendar invitation, calendar application plug-in 240 may receive an indication that the user has reported the electronic calendar invitation received at the user's electronic calendar. In response to receiving the indication that the user has reported the electronic calendar invitation, calendar application plug-in 240 may cause calendar application 238 to forward the electronic calendar invitation (suspicious calendar invitation) to a threat detection platform or to a security awareness administrator or to an Incident Response (IR) team that is responsible for threat triage or threat identification. In implementations, where calendar application 238 is integrated in email client 234 or is a part of email client 234, the user may report the electronic calendar invitation using email client plug-in 236.

In some implementations, simulated attack generator 216 may communicate electronic training to the user based at least on the detection of the interaction with the electronic calendar invitation by the user. In an example, the user may interact with the electronic calendar invitation (for example, by clicking on a link such as an install/download link or interacting with a pop up). A pop up may be understood to refer to the appearance of graphical or textual content on a display. In an example, the electronic training (for example, security awareness training) may be communicated/delivered to the user when the user fails the calendar-based simulated phishing attack. For example, the electronic training may be delivered to the user if the user interacted with the electronic calendar invitation and did not report or ignore the electronic calendar invitation. In some examples, the electronic training may be delivered via a link that is clicked by the user or via an attachment accessed/opened by the user. In an example, the electronic training may be delivered in various forms, for example, via a landing page link (such as a webpage link) or via a file attachment (such as an embedded video, a Word document, or Portable Document Format (PDF) file) to the electronic calendar invitation. In some examples, the means by which the electronic training is delivered (for example, via a landing page link or via a file attachment) may also vary according to a specific type of exploit that was used in the electronic calendar invitation.

In some implementations, risk score calculator 218 may determine a risk score for the user based at least on the detection of the interaction with the electronic calendar invitation by the user. In an example, risk score calculator 218 may determine the risk score for the user based on whether the user interacted with the electronic calendar invitation and/or based on how the user interacted with the electronic calendar invitation. A risk score for a user quantifies a cybersecurity risk that the user poses to an organization. In other words, a risk score of a user may be a representation of vulnerability of the user to a malicious attack. In one example, a user with a higher risk score may present a greater risk to the organization and a user with a lower risk score may present a lower risk to the organization.

In some embodiments, risk score calculator 218 may calculate more than one risk score for the user. In an example, risk score calculator 218 may calculate a risk score for the user based on email activities of the user. In some examples, risk score calculator 218 may calculate a different risk score for the user based on calendar activities of the user. In an implementation, risk score calculator 218 may calculate a composite risk score for the user based on combining multiple risk scores of the user in an aggregated manner. In some implementations, risk score calculator 218 may determine a risk score for the user based on an observed behavior(s) of the user with the electronic calendar invitation. In an example, mechanisms by which risk score calculator 218 may determine, assign, or update the risk score for the user may be diverse and may vary greatly.

In an example, risk score calculator 218 may calculate the risk score for the user based on passing user interactions. Examples of the passing user interactions may include following actions: forwarding of the electronic calendar invitation to a proper authority and reporting of the electronic calendar invitation via a calendar-based reporting mechanism (such as via the PAB within the calendar application 238). In some examples, risk score calculator 218 may calculate the risk score for the user based on neutral user interactions. In an example, the neutral user interactions may include an action such as opening of the electronic calendar invitation.

In some examples, risk score calculator 218 may calculate the risk score for the user based on minor failures. Examples of the minor failures may include following actions: deleting the electronic calendar invitation (for example, if reporting of the electronic calendar invitation is considered a success, i.e., the user successfully identifies the electronic calendar invitation as suspicious), accepting the electronic calendar invitation, declining the electronic calendar invitation, and proposing a new meeting time. In some examples, risk score calculator 218 may calculate the risk score for the user based major failures. Examples of the major failures may include following actions: clicking on any link in the electronic calendar invitation, opening an attachment in the electronic calendar invitation, entering credentials on the Uniform Resource Locator's (URL's) landing page, and forwarding the electronic calendar invitation to other users.

In some embodiments, risk score calculator 218 may evaluate (e.g. average or accumulate) a total number of failures of the user with respect to the electronic calendar invitation. In an example, risk score calculator 218 may evaluate the total number of failures over a period of time to calculate an overall phish prone percentage or the risk score. In an implementation, risk score calculator 218 may assign a binary pass/fail score to the user based on the user's response to the electronic calendar invitation. Further, risk score calculator 218 may update the overall risk score or phish prone percentage of the user based on the outcome. In an example, risk score calculator 218 may calculate the phish prone percentage as "100*(X/N)" where X represents the total number of failures observed over N electronic calendar invitations. In some examples, risk score calculator 218 may assign different weights or levels of significance to different attributes or characteristics of the user's interaction with the electronic calendar invitation. For example, interactions that are deemed 'failures' may be further classified as a minor level, a major level, or any other intervening level (such as on a scale between 1 and 10 and so forth). Risk score calculator 218 may then update the overall phish prone percentage or the risk score of the user based on these types of multi-level outcomes for the current electronic calendar invitation.

Further, risk score calculator 218 may define rewards for the user in recognition of the user demonstrating a desirable behavior (such as reporting a suspicious calendar invitation via a PAB). An intent of a reward may be to incentivize the user to repeat the reporting of suspicious or malicious calendar invitations. The reward may also serve the purpose of motivating other users to spot and report suspicious or malicious calendar invitations.

Figure 3:
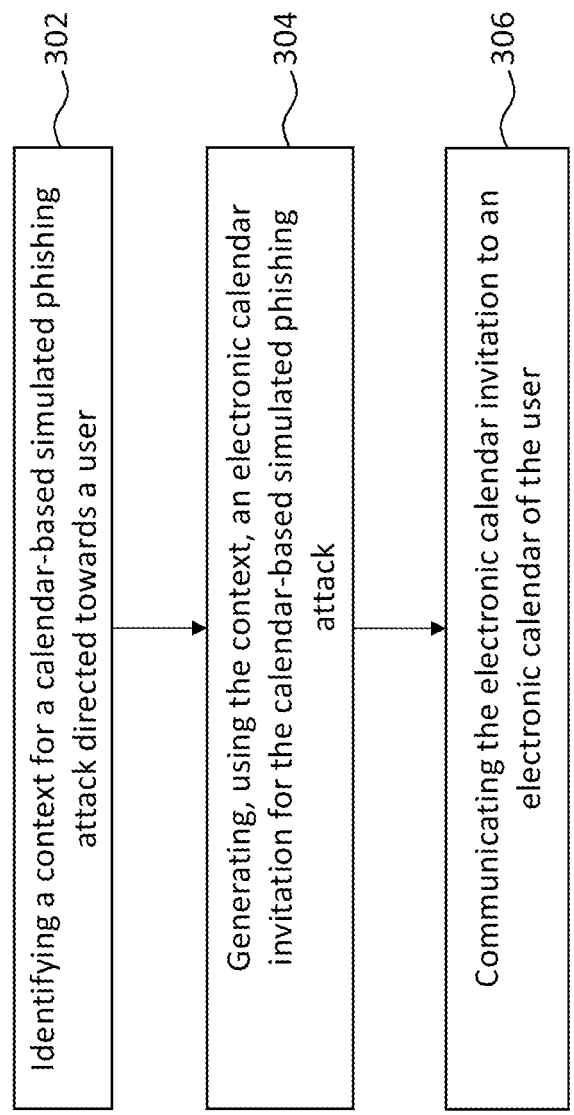
FIG. 3 depicts a flow chart for providing a calendar-based simulated phishing attack to a user of an organization, according to some embodiments.

FIG. 3 depicts a flow chart 300 for providing a calendar-based simulated phishing attack to a user of an organization, according to some embodiments.

Step 302 includes identifying a context for a calendar-based simulated phishing attack directed towards a user. In an implementation, security awareness training system 202 may determine the context from information about the user in one or more electronic calendars of the user. In some implementations, security awareness training system 202 may determine the context from information about the user in one or more databases $242_{1-N}$. In some implementations, security awareness training system 202 may determine the context from information about the user from one or more emails associated with the user or from one or more mailboxes of the user. In an embodiment, security awareness training system 202 may use a deterministic algorithm (such as one that may be represented by a series of instructions within an executable program code) to identify the context. In some embodiments, security awareness training system 202 may use an AI model or other ML models to identify the context. The one or more electronic calendars may interchangeably be referred to as the electronic calendar.

Step 304 includes generating, using the context, an electronic calendar invitation for the calendar-based simulated phishing attack. In an implementation, security awareness training system 202 may create suitable subject lines, body text, attachments, or links based on the context for generation of electronic calendar invitation. In an example, security awareness training system 202 may identify an email exchange regarding an editing of a project document. Based on the identification, security awareness training system 202 may subsequently use a title of the project document in a subject line of the electronic calendar invitation. In an implementation, security awareness training system 202 may generate the electronic calendar invitation with one or more exploits (such as one or more simulated exploits) to use the generated electronic calendar invitation for security awareness training purposes. In an example, security awareness training system 202 may add a link (such as to training materials via a landing page hosted by security awareness training system 202) and/or an attachment (such as training materials) in the electronic calendar invitation.

Step 306 includes communicating the electronic calendar invitation to an electronic calendar of the user. In an implementation, security awareness training system 202 may communicate the electronic calendar invitation to the electronic calendar of the user. In some implementations, security awareness training system 202 may communicate the electronic calendar invitation to the user via an email.

Figure 4:
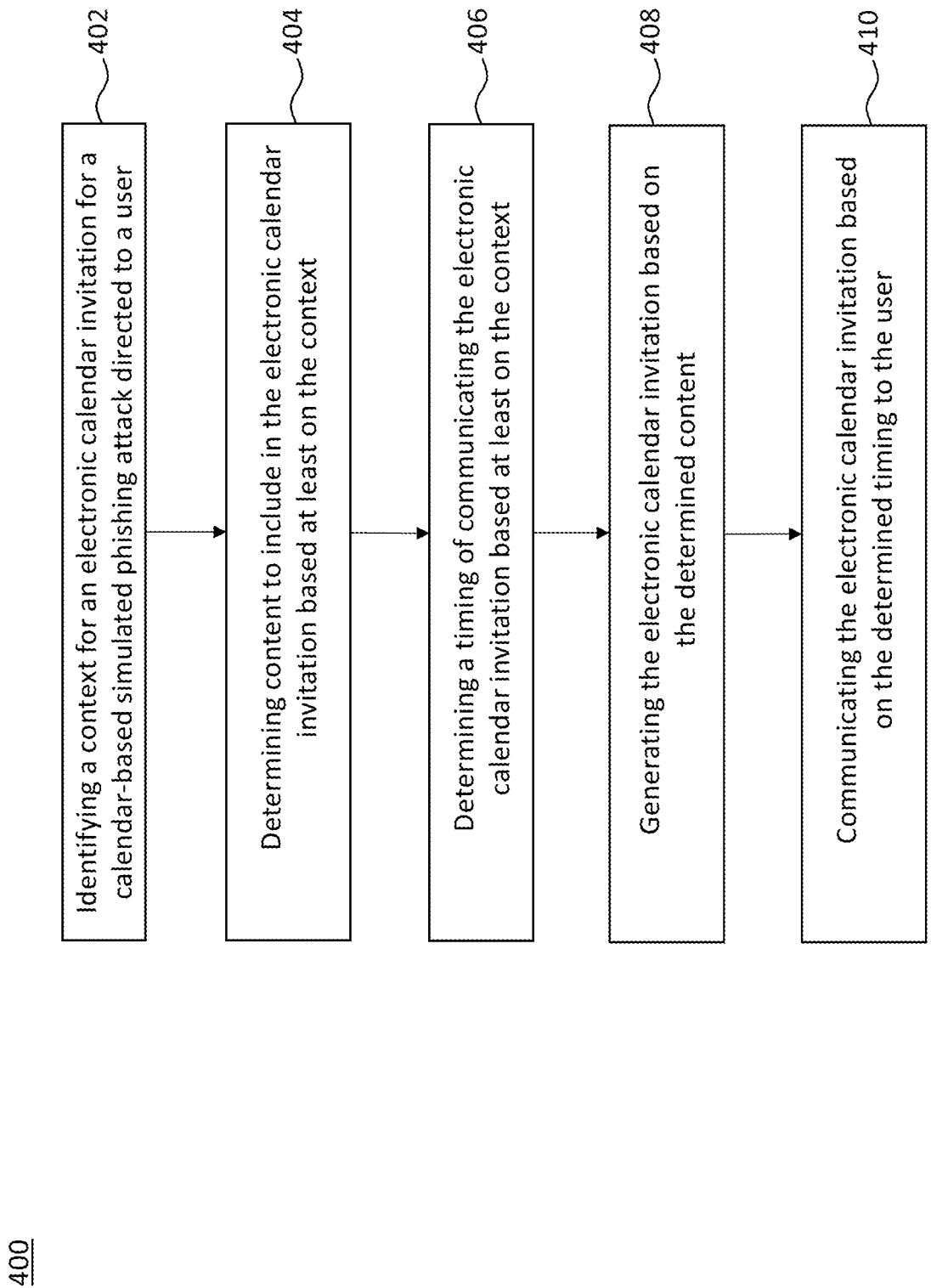
FIG. 4 depicts a flow chart for providing an electronic calendar invitation for a calendar-based simulated phishing attack to a user of an organization, according to some embodiments.

FIG. 4 depicts a flow chart 400 for providing an electronic calendar invitation for a calendar-based simulated phishing attack to a user of an organization, according to some embodiments.

Step 402 includes identifying a context for an electronic calendar invitation for a calendar-based simulated phishing attack directed to a user. In an implementation, security awareness training system 202 may determine the context from information about the user in one or more electronic calendars of the user. In an implementation, security awareness training system 202 may determine the context from information about the user in one or more databases $242_{1-N}$. In some implementation, security awareness training system 202 may identify/determine the context from information about the user from one or more emails associated with the user or from one or more mailboxes of the user. In an embodiment, security awareness training system 202 may use a deterministic algorithm (such as one that may be represented by a series of instructions within an executable program code) to identify the context. In some embodiments, security awareness training system 202 may use an AI model or other ML models to identify the context. The one or more electronic calendars may interchangeably be referred to as the electronic calendar.

Step 404 includes determining content to include in the electronic calendar invitation based at least on the context. In an example, the content may include, for example, a relevant subject or title (such as a project or product name). In an implementation, security awareness training system 202 may determine the content to include in the electronic calendar invitation based at least on the context.

Step 406 includes determining a timing of communicating the electronic calendar invitation based at least on the context. In an implementation, security awareness training system 202 may determine a timing of communicating the electronic calendar invitation based at least on the context. In an example, the electronic calendar invitation may appear to be more genuine if a legitimate time of communicating the electronic calendar invitation to the user is set or determined.

Step 408 includes generating the electronic calendar invitation based on the determined content. In an implementation, security awareness training system 202 may generate the electronic calendar invitation by including the content that provides a user-specific or a group specific context. Accordingly, the electronic calendar invitation when delivered to a group of users who are known to each other (such as a team responsible for delivery of the project or product) may appear to be genuine. Further, in an example, use of content providing the user-specific or the group specific context in the electronic calendar invitation may increase the likelihood of the user interacting with the electronic calendar invitation.

Step 410 includes communicating the electronic calendar invitation based on the determined timing to the user. In an implementation, security awareness training system 202 may communicate the electronic calendar invitation to the user. In an example, security awareness training system 202 may communicate the electronic calendar invitation to the user via an email. In some examples, security awareness training system 202 may insert the electronic calendar invitation directly into the electronic calendar of the user.

In an implementation, security awareness training system 202 may communicate the electronic calendar invitation based on the determined timing. In an example, security awareness training system 202 may communicate the electronic calendar invitation at a time that is within a predetermined time (for example, 5 minutes) before a scheduled event time included in the electronic calendar invitation. Such strategic timing for communicating the electronic calendar invitation to the user may impose a sense of urgency (for example, the user may believe himself or herself to be late for the meeting or the user may need to rush to the meeting) and increase a likelihood that the user will interact with the electronic calendar invitation.

Figure 5:
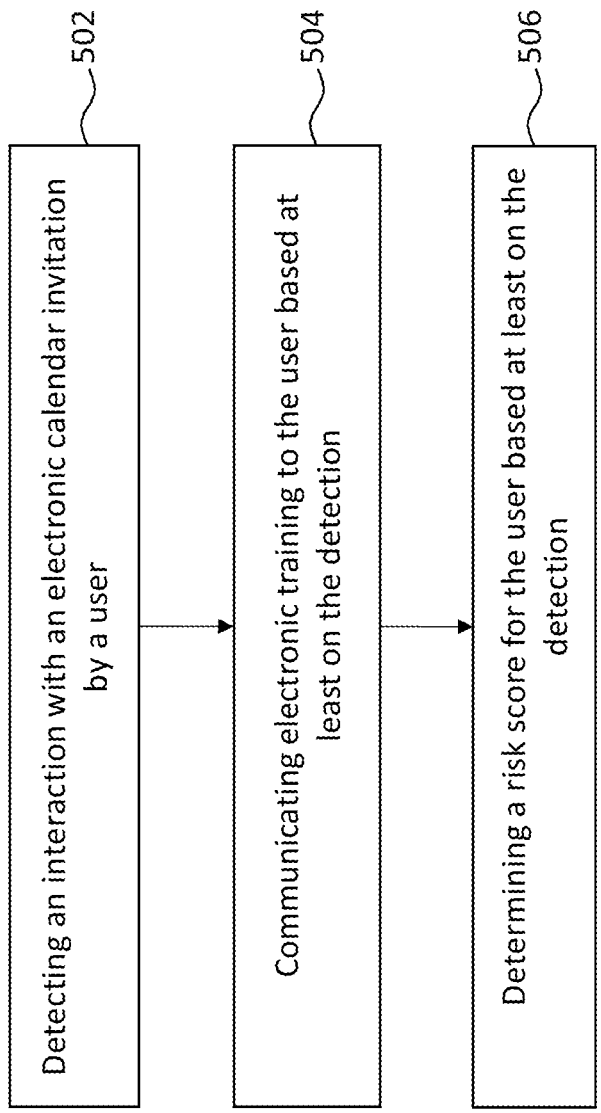
FIG. 5 depicts a flow chart for providing training to a user in response to detecting an interaction with an electronic calendar invitation, according to some embodiments.

FIG. 5 depicts a flow chart 500 for providing training to a user in response to detecting an interaction with an electronic calendar invitation, according to some embodiments.

Step 502 includes detecting an interaction with an electronic calendar invitation by a user. In an implementation, security awareness training system 202 may detect an interaction with the electronic calendar invitation by the user. In an example, on receiving the electronic calendar invitation or on becoming aware of presence of the electronic calendar invitation in an electronic calendar (for example, by viewing upcoming events), the user may interact with the electronic calendar invitation. In an example, the user may interact with electronic calendar invitation by accepting or tentatively accepting the electronic calendar invitation, declining the electronic calendar invitation, proposing a new meeting time, clicking on a link in the electronic calendar invitation, opening/downloading an attachment in the electronic calendar invitation, forwarding the electronic calendar invitation to other users, and deleting the electronic calendar invitation.

Step 504 includes communicating electronic training to the user based at least on the detection. In an implementation, security awareness training system 202 may communicate the electronic training to the user if the user interacts with the electronic calendar invitation. In an example, the electronic training may be delivered in various forms, for example, via a landing page link (such as a webpage link) or via a file attachment (such as an embedded video, a Word document, or Portable Document Format (PDF) file) to the electronic calendar invitation.

Step 506 includes determining a risk score for the user based at least on the detection. In an implementation, security awareness training system 202 may determine a risk score for the user based at least on the detection of the interaction with the electronic calendar invitation by the user. In an example, security awareness training system 202 may determine the risk score for the user based on whether the user interacted with the electronic calendar invitation and/or based on how the user interacted with the electronic calendar invitation. A risk score of a user may be a representation of vulnerability of the user to a malicious attack.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
    identifying, by one or more servers, a user for which to communicate a simulated phishing attack that uses an electronic calendar invitation;
    generating, by the one or more servers, the electronic calendar invitation of the simulated phishing attack with one or more meeting invitees appearing to have accepted the electronic calendar invitation;
    communicating, by the one or more servers, the electronic calendar invitation to an electronic calendar of the user; and
    identifying, by the one or more servers, an interaction with the electronic calendar invitation by the user.

2. The method of claim 1, further comprising identifying, by one or more servers, a context of the user for the simulated phishing attack.

3. The method of claim 2, further comprising generating, by the one or more servers, the electronic calendar invitation using the context.

4. The method of claim 2, further comprising identifying, by one or more servers, the context for the user based at least on other electronic calendar invitations of the user.

5. The method of claim 2, further comprising identifying, by one or more servers, the context from information from one or more emails associated with the user or from one or more mailboxes of the user.

6. The method of claim 1, further comprising causing, by the one or more servers, a schedule-tracking information panel of a calendar application to display one or more of the meeting invitees as having accepted the electronic calendar invitation.

7. The method of claim 1, further comprising inserting, by the one or more servers, benign content into the electronic calendar invitation.

8. The method of claim 7, wherein the content facilitates delivery of security awareness training to the user responsive to the user's interaction with the electronic calendar invitation.

9. The method of claim 1, further comprising generating, by the one or more servers, the electronic calendar invitation with a link or an attachment to training materials.

10. The method of claim 1, wherein the interaction comprises one of: accepting the electronic calendar invitation, tentatively accepting the electronic calendar invitation, declining the electronic calendar invitation, proposing a new meeting time for the electronic calendar invitation, clicking on a link in the electronic calendar invitation, opening or downloading an attachment in the electronic calendar invitation, forwarding the electronic calendar invitation, or deleting the electronic calendar invitation.

11. A system comprising:
one or more servers, comprising one or more processors, coupled to memory, the one or more servers configured to:
identify a user for which to communicate a simulated phishing attack that use an electronic calendar invitation;
generate the electronic calendar invitation of the simulated phishing attack with one or more meeting invitees appearing to have accepted the electronic calendar invitation;
communicate the electronic calendar invitation to an electronic calendar of the user; and identify an interaction with the electronic calendar invitation by the user.

12. The system of claim 11, wherein the one or more servers are further configured to identify a context of the user for the simulated phishing attack.

13. The system of claim 12, wherein the one or more servers are further configured to generate the electronic calendar invitation using the context.

14. The system of claim 12, wherein the one or more servers are further configured to identify the context for the user based at least on other electronic calendar invitations of the user.

15. The system of claim 12, wherein the one or more servers are further configured to identify the context from information from one or more emails associated with the user or from one or more mailboxes of the user.

16. The system of claim 11, wherein the one or more servers are further configured to cause a schedule-tracking information panel of a calendar application to display one or more of the meeting invitees as having accepted the electronic calendar invitation.

17. The system of claim 11, wherein the one or more servers are further configured to insert benign content into the electronic calendar invitation.

18. The system of claim 17, wherein the content facilitates delivery of security awareness training to the user responsive to the user's interaction with the electronic calendar invitation.

19. The system of claim 11, wherein the one or more servers are further configured to generate the electronic calendar invitation with a link or an attachment to training materials.

20. The system of claim 11, wherein the interaction comprises one of: accepting the electronic calendar invitation, tentatively accepting the electronic calendar invitation, declining the electronic calendar invitation, proposing a new meeting time for the electronic calendar invitation, clicking on a link in the electronic calendar invitation, opening or downloading an attachment in the electronic calendar invitation, forwarding the electronic calendar invitation, or deleting the electronic calendar invitation.

\* \* \* \* \*